(12) United States Patent
Umazume et al.

(10) Patent No.: US 6,363,972 B1
(45) Date of Patent: Apr. 2, 2002

(54) STRUCTURE FOR REDUCING FLUID RESISTIVITY ON BODY

(75) Inventors: Kousuke Umazume, Mitaka; Masanori Hashiguchi, Meguro-ku, both of (JP)

(73) Assignee: Kabushiki Kaisha Senkeikagakukenkyujyo, Tokyo (JP)

(*) Notice: Subject to any disclaimer, the term of this patent is extended or adjusted under 35 U.S.C. 154(b) by 0 days.

(21) Appl. No.: 09/477,005

(22) Filed: Jan. 3, 2000

(30) Foreign Application Priority Data

Jan. 7, 1999 (JP) .......................................... 11-001994

(51) Int. Cl.[7] .............................. F15D 55/00; F16L 9/00
(52) U.S. Cl. ........................................ 138/39; 138/177
(58) Field of Search ...................... 114/67 R; 244/204, 244/130; 138/39, 177

(56) References Cited

U.S. PATENT DOCUMENTS

| 4,619,423 A | * 10/1986 | Holmes et al. ............. 244/204 |
| 4,693,201 A | * 9/1987 | Williams et al. .......... 114/67 R |
| 4,736,912 A | * 4/1988 | Loebert .................... 114/67 R |
| 5,891,551 A | * 4/1999 | Gibbs ........................ 244/130 |
| 5,971,327 A | * 10/1999 | Loth .......................... 244/204 |

FOREIGN PATENT DOCUMENTS

| EP | 0466468 | 1/1992 |
| JP | 7-165156 | 6/1995 |
| JP | 8-014216 | 1/1996 |
| JP | 8-128413 | 5/1996 |

* cited by examiner

*Primary Examiner*—Lesley D. Morris
*Assistant Examiner*—Davis Hwu
(74) *Attorney, Agent, or Firm*—James Creighton Wray; Meera P. Narasimhan

(57) ABSTRACT

The present invention is aimed at reducing a fluid frictional resistance generated on a surface of a body which relatively moves in a fluid.

A structure on the body for reducing the fluid frictional resistance generated on a body B which relatively moves in the fluid wherein:

grooves M formed on a surface S of the body in order that grooves M lead the fluid flowing along the surface so as to turn flowing fluid to a direction of the moving direction X of the body.

8 Claims, 6 Drawing Sheets

B : Body
x : Flowing Direction of Fluid
S : Surface
M: Groove
R : Reversed Flow

B : Body
x : Flowing Direction of Fluid
S : Surface

B : Body
x : Flowing Direction of Fluid
S : Surface
M : Groove
R : Reversed Flow B : Body
M₁ : Groove B : Body
M₂ : Groove B : Body
M₃ : Groove B : Body
M₄ : Groove B : Body
M₅ : Groove B : Body
M₆ : Groove B : Body
Ma : Groove
k : Central Axis B : Body
Ma : Groove
k : Central Axis B : Body
Ma : Groove B : Body
Ma : Groove
C : Planed Surface

STRUCTURE FOR REDUCING FLUID RESISTIVITY ON BODY

This application claims priority benefit of Japanese Application 11-00 1994 filed Jan. 7, 1999.

BACKGROUND OF THE INVENTION

1. Field of the Invention

The present invention relates to a structure of a body enabling the body reduce a fluid frictional resistivity generated when the body relatively moves against the fluid.

2. Brief Description of the Related Art

As a conventional structure of a body for reducing a fluid frictional resistivity, structures with rib-lets formed longitudinally on bodies, for example, on outer surface of ships or on inner walls of pipelines in order to reduce drag force due to a turbulent flow of the fluid, have been employed.

These rib-lets are aimed at reducing the fluid frictional resistivity affecting the surface by changing artificially a shape of a fluid velocity distribution inevitably generated due to an effect of a viscosity of the fluid in a boundary layer in the vicinity of the surface of the body.

Since the above-mentioned rib-lets, however, can not avoid non-slip flows relating the fluid velocity distribution on the surface of the body, there is a problem that sufficient reduction of the fluid frictional resistance is not attained.

SUMMARY OF THE INVENTION

The present invention is carried out to eliminate the above-mentioned conventional problem.

As shown in FIG. 1, a fluid frictional resistivity generated on a flat surface of body B is proportional to a frictional stress ($\tau$) defined by a undermentioned equation where a ($du/dy$), (which can take any value, i.e. positive, zero or negative value) a linear gradient of a velocity distribution (u) of the fluid flowing in the direction (x) along the vertical direction (y) on the surface S of the body B, is multiplied by a viscosity coefficient ($\mu$) of the fluid.

$$\tau = \mu (du/dy)|_{y=0}$$

Therefore the fluid frictional resistivity of the body B can be reduced when the absolute value of the linear gradient ($du/dy$) is reduced or when the value of the gradient can be reversed from positive as shown in FIG. 1 to negative.

Accordingly, either by reducing differences of velocity components in the vicinity of the surface S of the body B to nearly zero, or by converting the value of the linear gradient ($du/dy$) from positive to negative, the fluid friction resistivity can be reduced.

For that purpose, in the present invention, grooves M are formed on the surface S of the body B so as to lead the fluid flowing along the surface S of the body B into the grooves and then to turn the flowing direction to the moving direction of the body, as shown in FIG. 2.

Thus, as shown in FIG. 2 at the bottom area of groove M reversed flows R of the fluid are generated by turning the flowing direction of the fluid and consequently the linear gradient of the fluid velocity along the flowing direction becomes negative. In addition, an absolute value of the linear gradient of the fluid in the area of grooves M can be decreased.

In the present invention grooves M are formed on the entire surface or on portions of the surface. In some cases long grooves can be formed continuously, while in other cases short ones intermittently or any combination of the long and short ones can be applicable.

Preferably the direction of the grooves M should be arranged in a way to cross the flowing direction of the fluid.

Grooves M with any cross-section are acceptable, provided that the cross-section can be effective in reducing the above-mentioned fluid frictional resistance. Examples of cross-sections are illustrated in FIGS. 3 to 8. In each figure, arrow mark represents the flowing direction of the fluid. In some cases the fluid flows parallel to the surface of the body, while in other cases it flows diagonally (in a crossing direction) to the surface.

A groove $M_1$ in FIG. 3 has a rectangular cross-section, a groove $M_2$ in FIG. 4 has a rectangular cross-section with a projection $H_1$ on a downstream edge and a groove $M_3$ in FIG. 5 has a rectangular cross-section with projections $H_2$ on upstream and downstream edges. A groove $M_4$ in FIG. 6 has a U-shaped cross-section with curved bottom corners. A groove $M_5$ in FIG. 7 has an elliptical cross-section while a groove $M_6$ in FIG. 8 has a circular cross-section.

Any kind of surface geometry such as flat, curved or corrugated etc. can be selected arbitrarily for the surface of the body B where grooves M are to be formed. A body with either a smooth or a rough surface can be employable in the present invention.

As a material for the body B, rigid, soft or elastic one can be employable. Any kind of material can be employable, as far as grooves M can be formed on the surface of it.

DETAILED DESCRIPTION OF THE PREFERRED EMBODIMENT

Hereinafter the detailed preferred embodiment according to the present invention is described.

Figure 1:
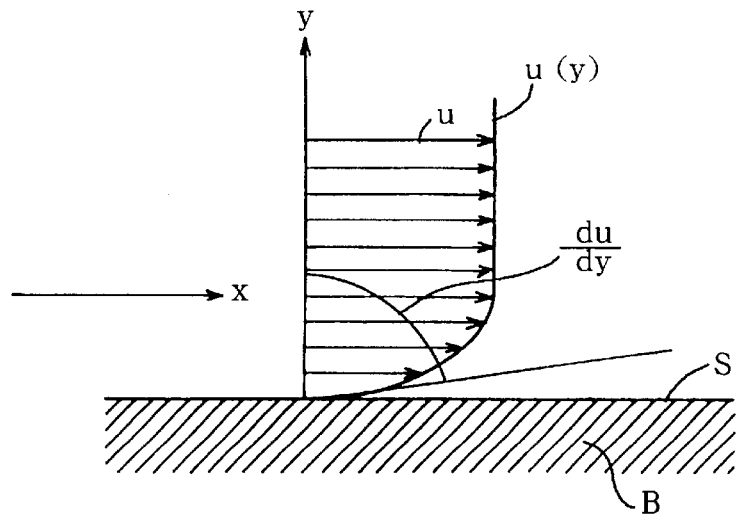
FIG. 1 illustrates flowing velocity distribution curve in the vicinity of a body surface.
Figure 2:
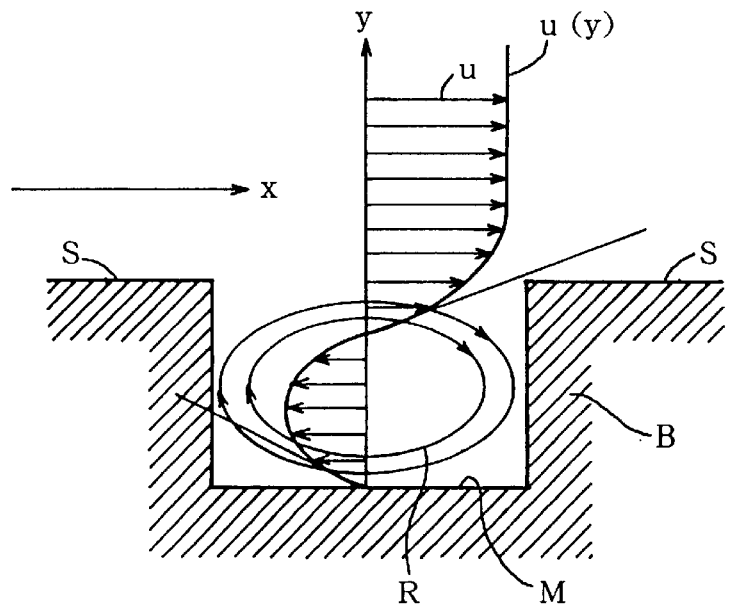
FIG. 2 illustrates a groove and flowing velocity distribution curve in the vicinity of the groove formed on a body surface.
Figure 3:
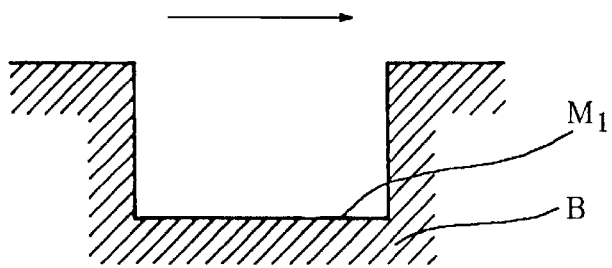
FIG. 3 is a rectangular cross-sectional view of a groove employable in the present invention.
Figure 4:
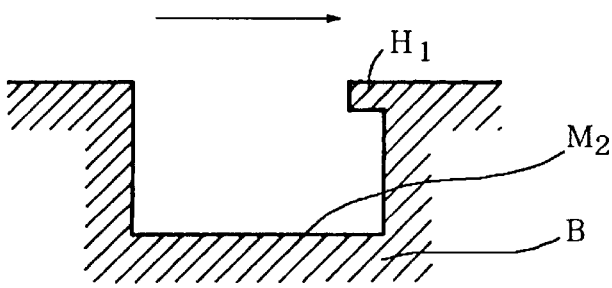
FIG. 4 is a rectangular cross-sectional view of a groove with a projection employable in the present invention.
Figure 5:
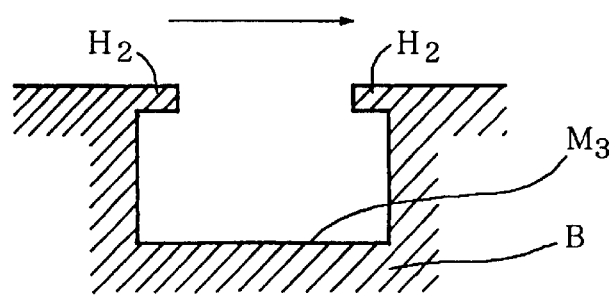
FIG. 5 is a rectangular cross-sectional view of a groove with two projections employable in the present invention.
Figure 6:
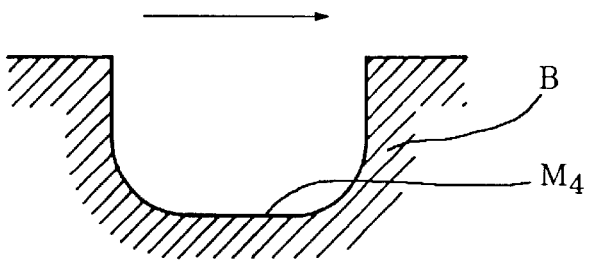
FIG. 6 is a U-shaped cross-sectional view of a groove employable in the present invention.
Figure 7:
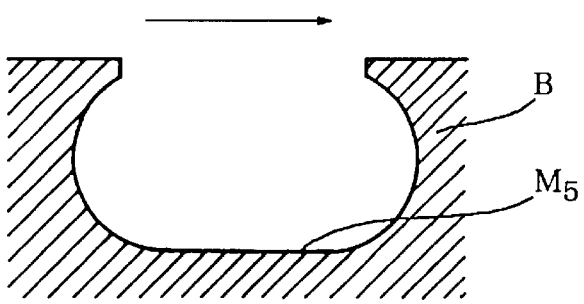
FIG. 7 is an elliptical cross-sectional view of a groove employable in the present invention.
Figure 8:
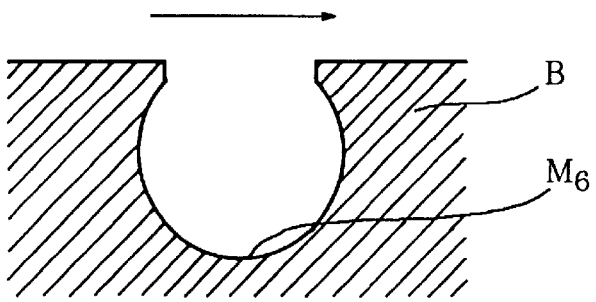
FIG. 8 is a circular cross-sectional view of a groove employable in the present invention.
Figure 9:
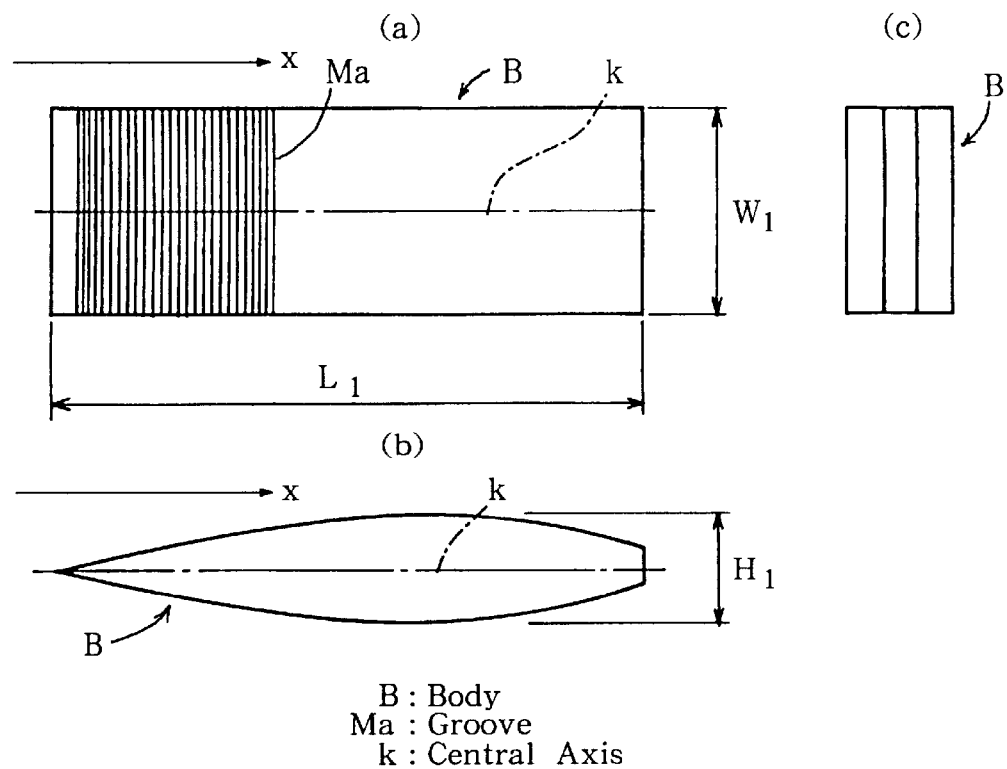
FIGS. 9a, 9b and 9c show a plane view, a side view and a front view of Model I with grooves respectively in the Embodiment.
Figure 10:
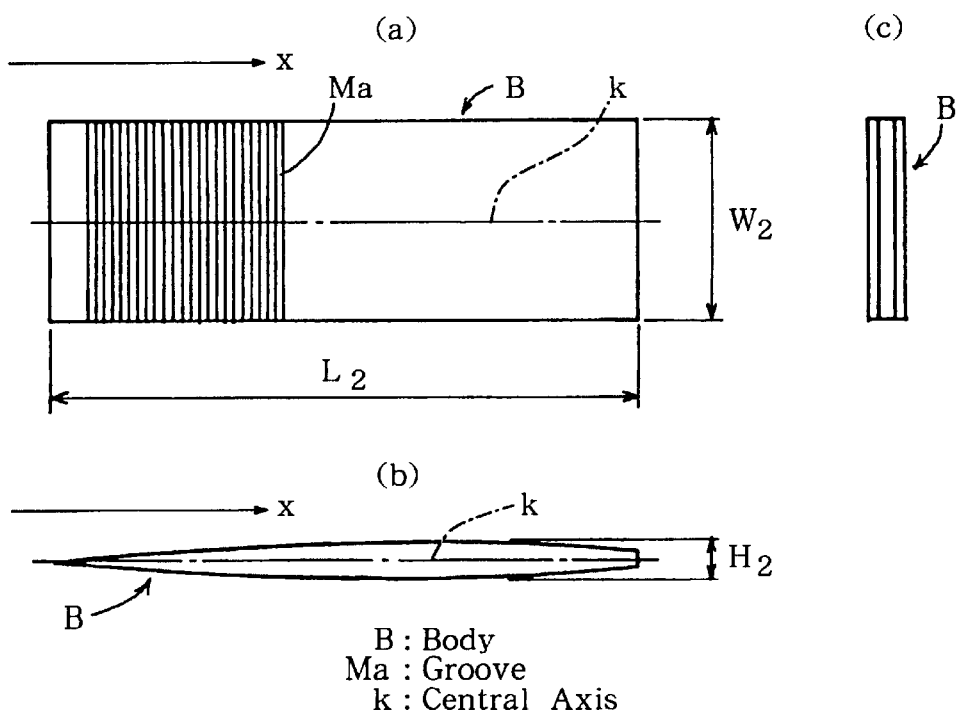
FIGS. 10a, 10b and 10c show a plane view, a side view and a front view of Model II with grooves respectively in the Embodiment.

Model I bearing grooves Ma in FIG. 9 and Model II bearing grooves Ma in FIG. 10 are placed in water which flows at the rate from 0.5 to 3.2 meters/second (referred to as "m/sec" hereafter) in the X direction depicted by an arrow and in water which flows at the rate from 0.5 to 4.0 m/sec in the X direction depicted by an arrow respectively and respective drag forces generating on Models I and II are measured. Since due to the measurement method these drag forces include pressure resistances as well as surface friction forces, by comparing drag forces of Models III and IV which will be described hereafter, effects of grooves Ma are examined.

As shown in FIG. 9 Model I having a rectangular shape in the plane view and having a wedge-like profile with edged top in the side view, is constituted by a flat body B made of a vinyl chloride resin with 29 grooves Ma (will be described hereafter) arranged parallel each other on both surface areas near edged top of the body in the direction of width ($W_1$). The length ($L_1$), the width ($W_1$) and height ($H_1$) of the body B are 450 millimeter (referred to as "mm" hereafter), 150 mm and 82 mm respectively.

As shown in FIG. 10 Model II having a rectangular shape in plane view and having a wedge-like profile with edged top in the side view, is constituted by a flat body B made of a vinyl chloride resin with 29 groves Ma arranged parallel each other on both surface areas near edged top of the body in the direction of width ($W_2$). The length ($L_2$), the width ($W_2$) and height ($H_2$) of the body B are 450 mm, 150 mm and 24 mm respectively.

Figure 11:
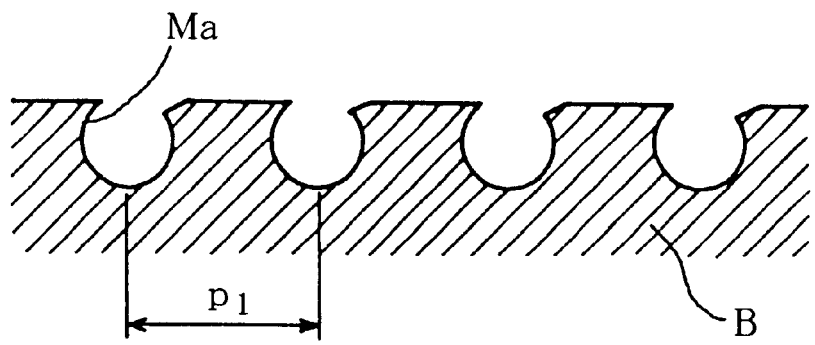
FIG. 11 is a cross-sectional view of grooves in Model I and II.
Figure 12:
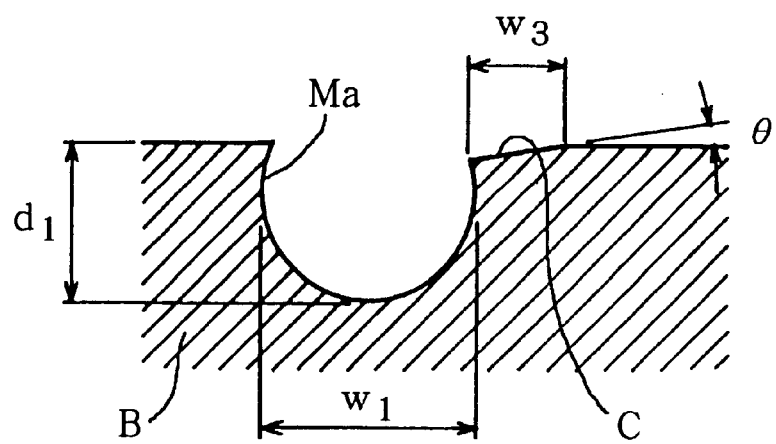
FIG. 12 is a magnified cross-sectional view of a main part in FIG. 11.

As shown in FIGS. 11 and 12 grooves Ma in Models I and II have circular cross-sections of which width ($w_1$) and depth ($d_1$) are 2.4 and 1.8 mm respectively. At the corner areas in rear end sides (downstream sides of water) of grooves Ma, planed surfaces C with the 8 degree gradient are formed. Their width ($w_3$) is 1.0 mm. In Model I 29 grooves Ma are arranged with a 5.5 mm pitch ($p_1$) starting from the position 33 mm from the edged top. In Model II grooves Ma are arranged with a 5.5 mm pitch ($p_1$) starting from the position 53 mm from the edged top.

As mentioned above Models I and II are placed in the flowing water so as to let edged tops face upstream. Namely, both are arranged in order for center axis of Models are aligned parallel to flowing direction X of the water.

Drag forces in cases of Model III and Model IV (though not illustrated) of which shapes are similar to those of Model I and Model II, but with no grooves Ma respectively, are measured in the same way as in Models I and II.

Figure 13:
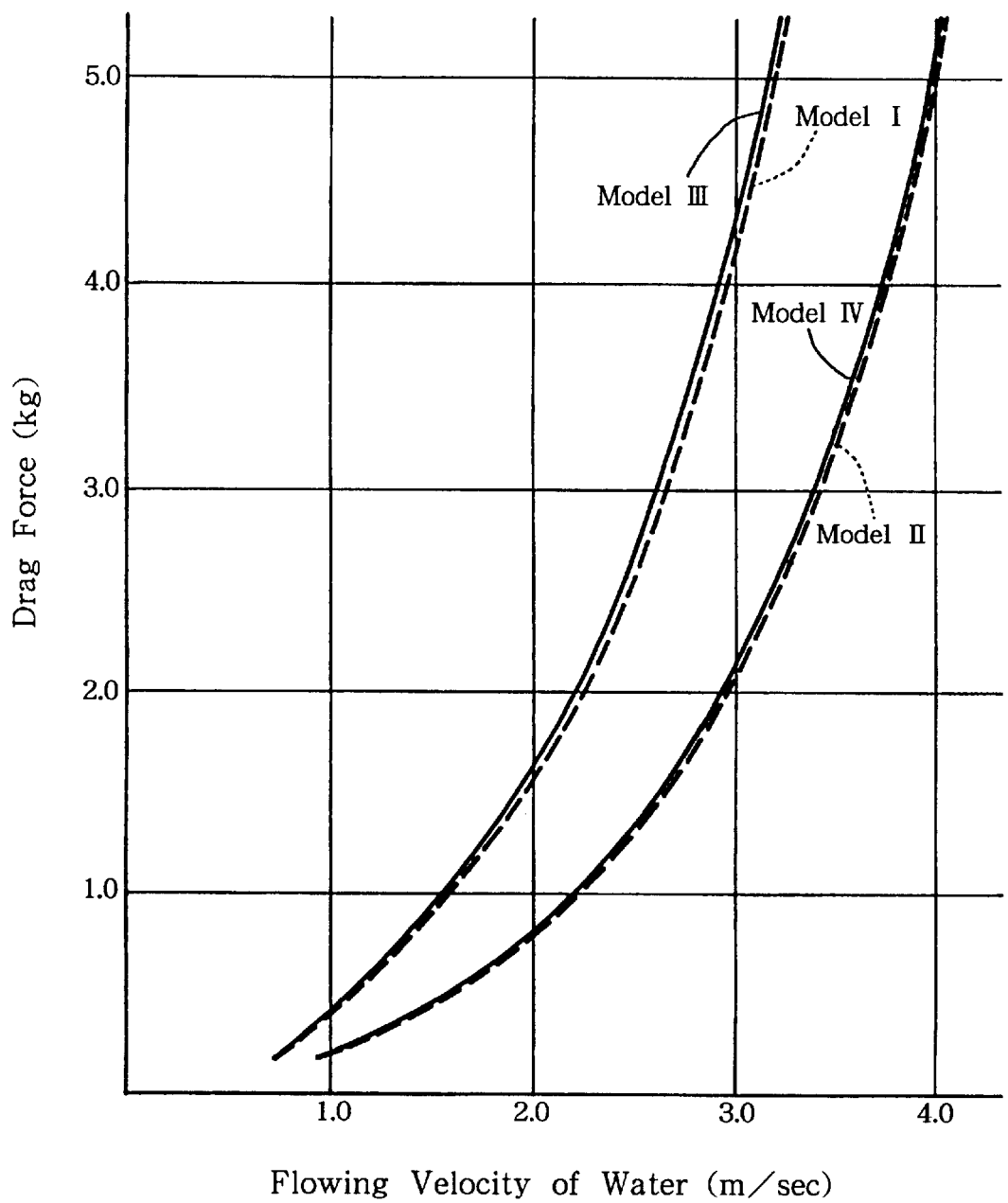
FIG. 13 is a chart showing relationship between flowing velocities of water and drag forces on Models I and II compared with reference Models III and IV.

FIG. 13 is a chart illustrating the results of the measurement of drag forces on Models I and II compared with the results of the reference Models III and IV respectively. In this measurement, however, drag forces include resistances of supporting jigs of Models I and II.

From FIG. 13 it is obvious that the drag force of Model I is on average 1.53% lower than that of the reference Model III. And the drag force of Model II is on average 0.6% lower than that of the reference Model IV.

As mentioned above, according to the present invention, since grooves formed on the surface of the body, turn the flowing direction of the fluid to moving direction of the body, the fluid frictional resistance generated on the surface of the body can be effectively reduced.

What is claimed is:

1. A structure on a body for reducing a fluid frictional resistivity generated on said body which relatively moves in said fluid wherein:

grooves normal to a flow direction are formed on a surface of said body in order that said grooves lead said fluid flowing along said surface to said grooves so as to turn said flowing fluid to a direction of said moving direction of said body, wherein each of said grooves has a rectangular cross-section.

2. A structure on a body for reducing a fluid frictional resistivity according to claim 1, wherein each of said grooves bears projections at least on one of upstream edge and downstream edge of said groove.

3. A structure on a body for reducing a fluid frictional resistivity generated on said body which relatively moves in said fluid wherein:

grooves normal to a flow direction are formed on a surface of said body in order that said grooves lead said fluid flowing along said surface to said grooves so as to turn said flowing fluid to a direction of said moving direction of said body, wherein each of said grooves has a cross-section selected from a group consisting of U-shaped, elliptical, circular cross-sections and combinations thereof.

4. A structure on a body for reducing a fluid frictional resistivity generated on said body which relatively moves in said fluid wherein:

grooves are formed on a surface of said body to cross a flowing direction of the fluid in order that said grooves lead said fluid flowing along said surface to said grooves so as to turn said flowing fluid to a direction of said moving direction of said body, wherein each of said grooves has a rectangular cross section.

5. A structure on a body for reducing a fluid frictional resistivity according to claim 4, wherein each of said grooves bears projections at least on one of an upstream edge and a downstream edge of said groove.

6. A structure on a body for reducing a fluid frictional resistivity generated on said body which relatively moves in said fluid wherein:

grooves are formed on a surface of said body to cross a flowing direction of the fluid in order that said grooves lead said fluid flowing along said surface to said grooves so as to turn said flowing fluid to a direction of said moving direction of said body, wherein each of said grooves has a U-shaped cross-section.

7. A structure on a body for reducing a fluid frictional resistivity generated on said body which relatively moves in said fluid wherein:

grooves are formed on a surface of said body to cross a flowing direction of the fluid in order that said grooves lead said fluid flowing along said surface to said grooves so as to turn said flowing fluid to a direction of said moving direction of said body, wherein each of said grooves has an elliptical cross-section.

8. A structure on a body for reducing a fluid frictional resistivity generated on said body which relatively moves in said fluid wherein:

grooves are formed on a surface of said body to cross a flowing direction of the fluid in order that said grooves lead said fluid flowing along said surface to said grooves so as to turn said flowing fluid to a direction of said moving direction of said body, wherein each of said grooves has a circular cross-section.

* * * * *